(No Model.)   4 Sheets—Sheet 1.

M. C. JOHNSON.
MACHINE FOR SHARPENING DRILLS.

No. 292,229.   Patented Jan. 22, 1884.

Witnesses.
Edwin F. Dimock.
W. M. Bjorkman.

Inventor.
Moses C. Johnson,
By Simonds & Burdett
Attys.

(No Model.) 4 Sheets—Sheet 2.

M. C. JOHNSON.
MACHINE FOR SHARPENING DRILLS.

No. 292,229. Patented Jan. 22, 1884.

Witnesses.
Edwin F. Dimock.
W. M. Bjerkman

Inventor.
Moses C. Johnson,
By Simonds & Burdett
Att'ys.

(No Model.) 4 Sheets—Sheet 3.
M. C. JOHNSON.
MACHINE FOR SHARPENING DRILLS.
No. 292,229. Patented Jan. 22, 1884.
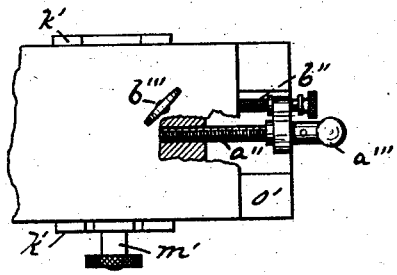
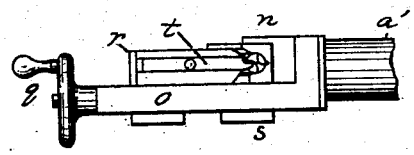
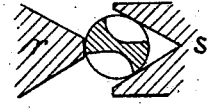
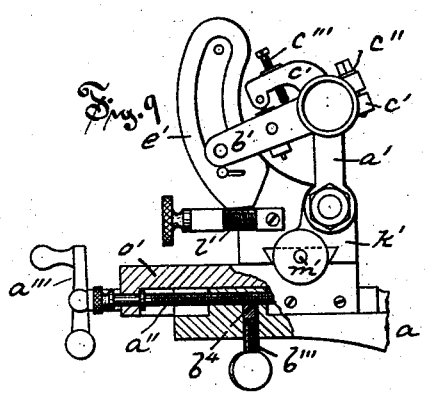
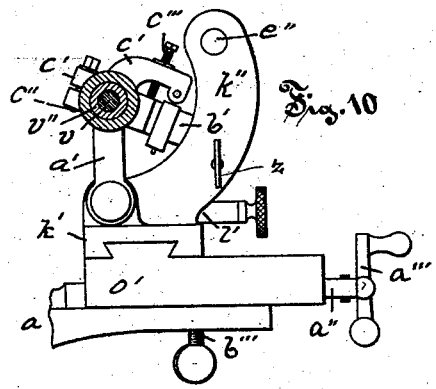
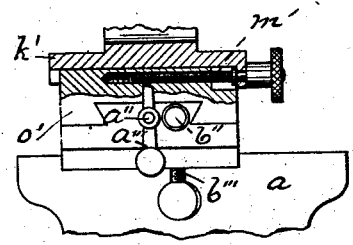

(No Model.) 4 Sheets—Sheet 4.

M. C. JOHNSON.
MACHINE FOR SHARPENING DRILLS.

No. 292,229. Patented Jan. 22, 1884.

Witnesses
W. M. Bjorkman
E. H. Dimock

Inventor.
Moses C. Johnson
By Simonds & Burdett
Attys

UNITED STATES PATENT OFFICE.

MOSES C. JOHNSON, OF HARTFORD, CONNECTICUT, ASSIGNOR TO WILLIAM N. WOODRUFF, OF SAME PLACE.

MACHINE FOR SHARPENING DRILLS.

SPECIFICATION forming part of Letters Patent No. 292,229, dated January 22, 1884.

Application filed April 26, 1883. (No model.)

*To all whom it may concern:*

Be it known that I, MOSES C. JOHNSON, of Hartford, in the county of Hartford and State of Connecticut, have invented certain new and useful Improvements in Machines for Sharpening Drills; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

Figure 1:
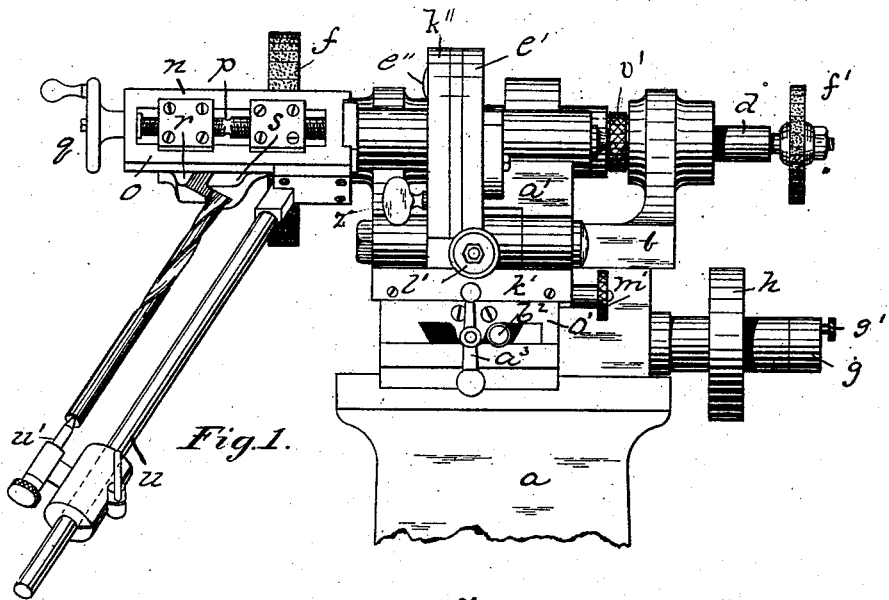
Figure 2:
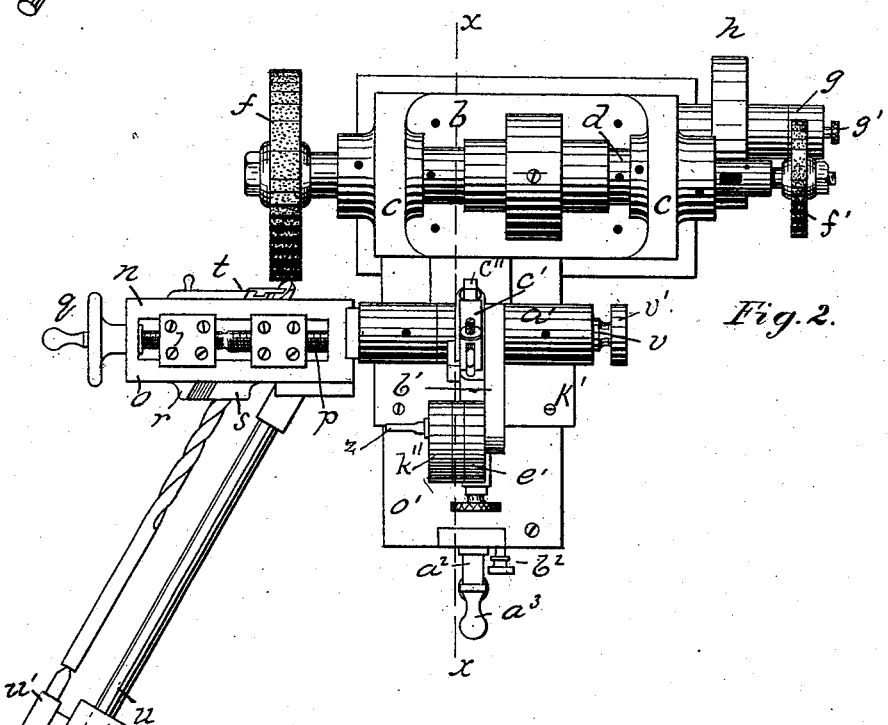
Figure 3:
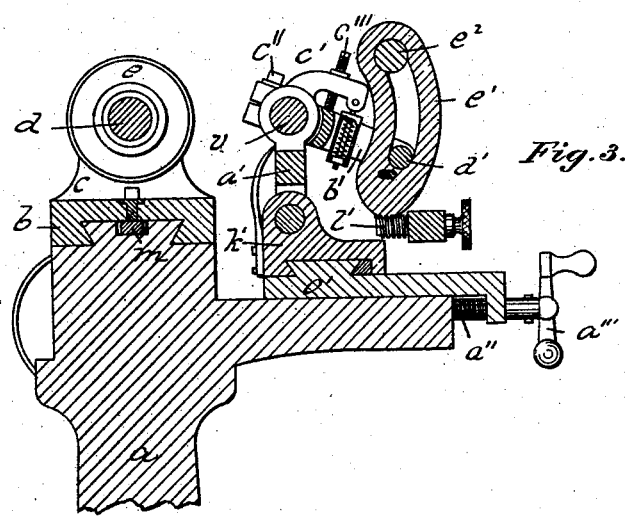
Figure 4:
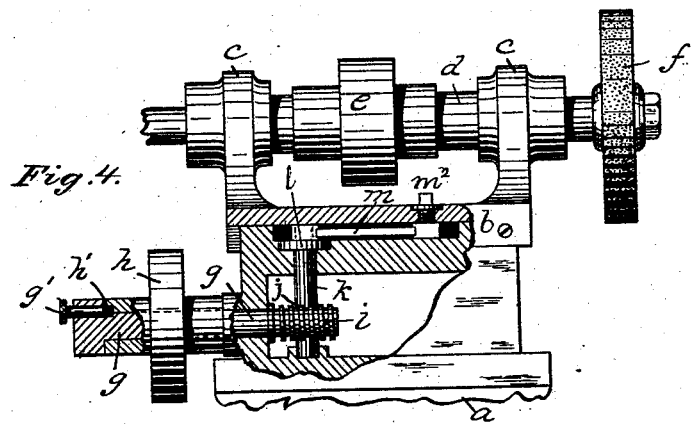
Figure 5:
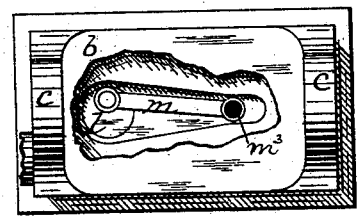
Figure 13:
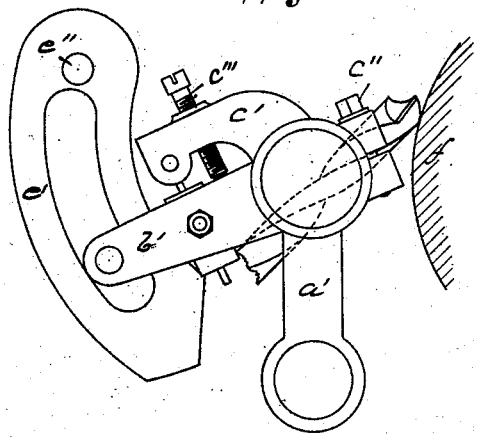
Figure 14:
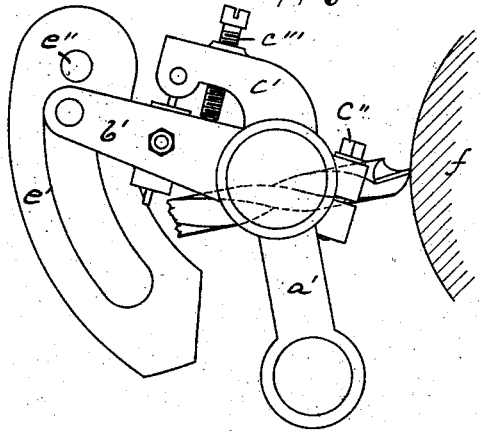
Figure 15:
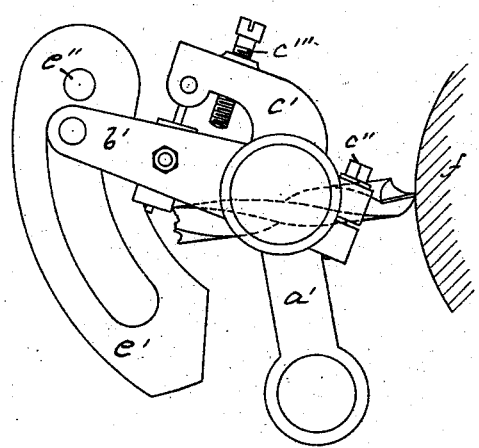
Figure 16:
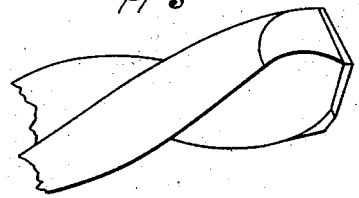

Figure 1 is a front view of my improved machine, with part of the standard removed. Fig. 2 is a top view of same. Fig. 3 is a view in cross-section of same on plane denoted by line $xx$ of Fig. 1. Fig. 4 is a rear view of the head parts cut away to show interior construction. Fig. 5 is a top view of part of the machine, showing crank and connecting-rod. Fig. 6 is a detail bottom view of bracket and slide, with parts cut away to show, operatively, the rod for reciprocating the slide. Fig. 7 is a detail edge view of the chuck-frame, showing the lip-gage in face view. Fig. 8 is a detail view in cross-section of the drill and holding-jaws of the chuck. Fig. 9 is a detail side view of the slide and parts borne on it, looking from the right. Parts are cut away to show the adjustable screw-stop and binding-screw operatively. Fig. 10 is a detail side view of the parts shown in Fig. 9, but viewed from the opposite or left side. Fig. 11 is a detail view in longitudinal section through the screw-shaft of the chuck and the shaft to which it is attached. Fig. 12 is a detail view, showing operatively an ordinary device for sliding one part upon the other. Figs. 13, 14, 15 are diagram views, showing the relative position of the wheel, the frame, arms, cam, and drill in different stages in the act of sharpening a drill. Fig. 16 is a detail view of a point of a drill as sharpened on my improved machine.

My invention relates to machines for sharpening drills clamped to movable parts of the machine; and it consists in improved combinations of parts by which the drill is ground to the required pitch or slope of point, the exact correspondence of opposite sides determined automatically, and the angle of the cutting-edge and amount of clearance also automatically duplicated.

In the accompanying drawings, the letter $a$ denotes the base or standard of the machine; $b$, a head dovetailed to the base, and adapted to slide laterally; $c$, standards or bearings for spindle $d$, fast to which are the pulley $e$ and grinding-wheels $f f'$. The shaft $g$, rotarily secured to one side of the base, bears the loose pulley $h$ and, within the base, the worm $i$ in mesh with a worm-gear, $j$, on the upright shaft $k$, which bears the crank-disk $l$ connected to the sliding head by rod $m$, pivoted to the disk and to the head $b$. The pivot $m^2$, Fig. 4, is secured to the head $b$ in a threaded socket, and its lower part takes into the hole $m^3$, Fig. 5, in the rod $m$ so that when crank-disk $l$ rotates, the head $b$ is moved by means of the connected parts above described. When driven by a belt, as from a counter-shaft, the turning of the pulley $h$ reciprocates the grinder $f$ across the lip of the drill which is being sharpened, thus turning up the face of the grinding-wheel as it wears. When it is desired to stop the traversing motion of the head, the clutch-pin $g'$ is withdrawn from the socket $h'$ and the pulley $h$ turns freely on the shaft $g$. The grinding-wheel $f'$ is a thin one, used generally to reduce the thickness of the web or center of a twist-drill before forming the cutting-point.

The eccentric-chuck $n$ consists of the frame $o$, screw $p$, jaws $r s$, hand-wheel $q$, lip-gage $t$, and length-gage $u'$ on rod $u$. Screw $p$ has at one end a right-hand thread, and at the other a left-hand thread, the pitch or lead of the one end being about one and one-half time that of the other. By rotating screw $p$, as by the hand-wheel $q$, the female jaw $s$, with the re-entrant face and the male jaw $r$, are drawn together at such degrees of progression that cylindrical drills of various diameters are each held with its axis parallel to the gage-rod $u$. The lip-gage $t$ is fitted, preferably, to one of the chuck-jaws, so as to bear against the drill in the flute quite near the cutting-edge. This gage is fitted to slide in a socket in the upper or front side of the male jaw, and takes into the flute of the drill about an eighth of an inch back of the lip that is being sharpened in such position as to prevent rotary motion of the drill. It also determines the positions of the cutting-lips with reference to the flute, and makes them uniform.

To adapt the length-gage to different lengths of drills, the base $u'$ is made adjustable by means of any ordinary form of screw-clamp, and it may bear any suitable form of rest required to fit the end of the drill resting upon it. The chuck $n$ is secured to the swinging frame $a'$ by means of the shaft $v$, Fig. 11, which has a milled head, $v'$, (for convenience in connecting the parts,) at one end, and a thread at the other fitted to a threaded socket in the chuck-frame. This shaft has a sleeve, $v''$, between it and the bearing in the upper part of the swinging frame, and about centrally of its length it bears the projecting arms $b'$ $c'$. The chuck is secured to the shaft $v$ in such position that the axis of the drill held in the chuck is never in the line of the axis of the shaft, but is fixed at one side of such line, and the drill revolves about that line when the parts are so moved as to rotate the shaft $v$. By this arrangement of parts the curve to which the end of the drill is ground may make a more acute angle with the axis of the drill than could be made if the axis of the latter were in the line of the pivot-shaft, and thus a greater amount of clearance is gained. The long arm $b'$ is loose upon the sleeve of the shaft, about which it is free of turn, (see Fig. 11,) and this arm bears on the side, at its outer end, a friction-roll, $d'$, which engages with a slot in cam $e'$. The short arm $c'$ is also attached to the sleeve about the shaft, (see Fig. 11,) but is provided with any ordinary means for clamping it to the sleeve and shaft, so that when the shaft is turned the arm shall turn with it. In the device shown, the square-headed bolt $c''$ passes through sockets on both sides of the slit in the back of the arm, where it encircles the sleeve and shaft and serves to clamp the arm to it.

To the outer end of arm $c'$ is pivoted a rod, which passes through a swivel-box formed of a short cylinder pivoted to the side of the long arm $b'$, and in this box and about the rod is arranged a spiral spring, between the upper head of the cylinder and a nut on the lower end of the rod. The screw $c'''$ is fitted in a threaded socket in the arm $c'$, and bears with its lower end on the upper surface of the arm $b'$. This screw is used to determine the relative position of the two arms, as by its use they may be drawn close together or fixed at an angle determined by the length of the screw and the compressibility of the spring. The arms and connected parts are shown in Figs. 1, 2, 3, 9, 10, 11, 13, 14, 15, and in the three latter views their peculiar function is clearly illustrated. These are diagram views, and the chuck and other parts are omitted for the sake of clearness. The frame $a'$ is pivoted to the slide $k'$, which bears an upright arm, $k''$, to which the cam $e'$ is pivoted at its upper end, as by pivot $e''$, and said frame has a movement parallel with the wheel-spindle, for the purpose of locating the lips of a drill in proper relation to wheel $f$. The slide $k'$ is attached to the head $o'$ by means of the dovetailed tenon and socket, and the threaded shaft $m'$ (see Fig. 12) serves to determine the relative position of these parts in a common and obvious manner. The lower end of cam $e'$ bears a segment of a worm-gear in mesh with the worm $l'$, by which the cam is adjusted with reference to the frame. This adjustability of the cam determines the amount of clearance on the drill-face, as by moving the cam toward the wheel-spindle, the frame, chuck, and end of drill are carried nearer the wheel by the long arm at the lower limit of its play, while an outward movement of the cam withdraws these parts, and makes more obtuse the angle formed by the axis of the drill and its edge back of the immediate cutting-edge. This function of the cam is shown in Figs. 13 and 14, as well as the fact that the curve of the drill end, as cut away to make the clearance, is a compound curve whose outline is determined mainly by the shape of the cam-slot, the position of the cam, and the distance at which the axis of the drill is fixed on one side of the line of the axis of the shaft $v$. When a drill is being ground and this clearance formed, the arms move together, the tension of the spring in the swivel-box causing the arm $b'$ to move with arm $c'$, which is clamped to the shaft $v$ until the roller on arm $b'$ reaches the upper limit of the slot, and then the frame stops swinging, and the arm $c'$ lifts from arm $b'$ until stopped by the limit of compression of the spring. The lateral displacements of the axis of the drill with regard to the axis of the rock-shaft $v$ is now a factor in determining the curvature of the immediate cutting-edge, which is formed at a very obtuse angle (preferably constant in any given machine) with the axis of the drill, as shown in Fig. 15, and is so small a section of the whole curve as to be practically flat. This slide $o'$ moves on a bracket fast to the base, and forms the feeder-slide, which by means of the screw-shaft $a''$, (see Fig. 6,) having crank $a'''$, carries the chuck and drill to and from the wheel $f$, for grinding more or less from the cutting-edge of the drill. An adjustable stop-screw, $b''$, (see Figs. 6 and 9,) limits the inward movement of the slide, and it is provided with a binder-screw, $b^3$, and shoe $b^4$ for fastening the stop-screw $b''$ when one of the lips of the drill has been ground, so that when the drill is turned half-way round, to present the other lip, that is cut in exact duplicate of the first.

The operation of my device is as follows: A drill to be ground is placed between the jaws of chuck $n$ and the jaws closed by turning screw $p$ until they are nearly in contact with the drill, which is then rotated until the lip-gage bears firmly against the back of the lip to be ground at a point about one-eighth of an inch back of its end. The drill is then securely clamped in the chuck with enough of its end projecting so that the wheel will not cut into the gage in grinding, and the length-gage $u$ is clamped against the outer end of the drill. By means of the feed-screw the slide $o'$ and its appurtenant parts are moved toward the rotating grinding-wheel $f$, and at the same time the drill is worked by moving its outer end up and down, which motion also rotates the chuck, rock-shaft, and appurtenant arms, causing the wheel to cut away the end of the drill on a curve depending on the adjustment of the cam by the means already described. After completing the cutting of one lip and its clearance the drill is released from the chuck, rotated, and again secured in the chuck, so that the other lip may be operated upon, and it is then cut to the exact counterpart of the first lip by the means and method already described.

The function of the screw $z$ in the side of the arm $k''$ is to hold the cam in any desired position in the limits of its play by clamping it to the arm $k''$. This device $z$ is simply an ordinary thumb-screw which works through said arm $k''$.

I claim as my invention—

1. In combination, chuck-frame $o$, male jaw $v$, with projecting face, female jaw $s$, with re-entrant angular face, and feed-screw $p$, having at opposite ends right and left hand threads, respectively, the thread feeding the female jaw having one and one-half time the pitch of the other, whereby the center of drills of various diameters as held by said jaws will be parallel to and equidistant from the axis of the gage-rod $u$, all substantially as described.

2. In a drill-grinder, the combination of the chuck $n$, the rock-shaft $v$, bearing the connected arms $b'$ $c'$, frame $a'$, and upright arm $k''$, bearing the cam $e'$, all substantially as described.

3. In combination, the slide $k'$, bearing arm $k''$, the cam $e'$, pivoted to said arm and having at its lower end the segment of a worm-gear, the worm $l'$, and the connected drill-grinding mechanism, all substantially as described.

4. In a drill-grinder, in combination, the frame $a'$, the chuck $n$, the shaft $v$, bearing the adjustable arm $c'$, connected with movable arm $b'$, adjustable cam $e'$, pivoted to arm $k''$, and slide $k'$, all substantially as described.

5. In a drill-sharpener, the swinging frame $a'$, adjustable cam $e'$ with the connecting-arms $b'$ and $c'$, in combination with the connected drill-grinding mechanism, all substantially as described.

6. In a drill-grinder, a chuck pivoted to a swinging frame and adapted to hold a drill with its axis below the line of the axis of the pivot, in combination with the drill-grinding mechanism, all substantially as described.

7. In a drill-grinder, a chuck pivoted to a swinging frame and adapted to hold a drill with its axis out of line with the axis of the pivot, in combination with the drill-grinding mechanism, for the purpose set forth.

MOSES C. JOHNSON.

Witnesses:
CHAS. L. BURDETT,
WM. H. MARSH.